United States Patent
Riordan

(10) Patent No.: US 9,957,060 B2
(45) Date of Patent: May 1, 2018

(54) DEPLOYABLE INLET SCOOP FOR AN INBOARD RAM AIR TURBINE

(75) Inventor: Conor Riordan, Grand Rapids, MI (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days. days.

(21) Appl. No.: 13/425,933

(22) Filed: Mar. 21, 2012

(65) Prior Publication Data

US 2013/0248657 A1    Sep. 26, 2013

(51) Int. Cl.
*B64D 41/00* (2006.01)
*F03D 9/00* (2016.01)

(52) U.S. Cl.
CPC ............ *B64D 41/007* (2013.01); *F03D 9/00* (2013.01); *F05B 2220/31* (2013.01); *Y02E 10/72* (2013.01)

(58) Field of Classification Search
USPC ................. 244/53 B, 118.5, 129.4, 129.5
See application file for complete search history.

(56) References Cited

U.S. PATENT DOCUMENTS

| | | | | |
|---|---|---|---|---|
| 3,533,238 A | * | 10/1970 | Marvin ................ | F02C 7/057 137/15.2 |
| 3,659,424 A | | 5/1972 | Polk, Jr. | |
| 3,695,387 A | | 10/1972 | Hilbig | |
| 3,915,413 A | * | 10/1975 | Sargisson ............. | B64D 33/02 137/15.2 |
| 4,203,566 A | * | 5/1980 | Lord ..................... | B64D 13/00 165/41 |
| 4,418,708 A | * | 12/1983 | Schulze ................ | F02C 7/042 137/15.2 |
| 4,418,879 A | * | 12/1983 | Vanderleest .......... | B64D 33/02 137/15.1 |
| 4,653,707 A | * | 3/1987 | Hamilton .............. | B64D 9/00 187/264 |
| 5,014,888 A | * | 5/1991 | Bryan ................... | B65D 5/744 222/541.5 |
| 5,165,228 A | | 11/1992 | Enderle | |
| 5,577,487 A | * | 11/1996 | Ohtake ................. | F02D 41/1475 123/679 |

(Continued)

FOREIGN PATENT DOCUMENTS

| | | |
|---|---|---|
| GB | 2 241 745 A | 9/1991 |
| WO | 87 04403 | 7/1987 |
| WO | 01 54981 A2 | 8/2001 |

*Primary Examiner* — Timothy D Collins
*Assistant Examiner* — Keith L Dixon
(74) *Attorney, Agent, or Firm* — Carlson, Gaskey & Olds, P.C.

(57) ABSTRACT

An aircraft includes a fuselage that has an exterior contour with an opening and a duct that is arranged interiorly of the exterior contour and extends from the opening. A ram air turbine is arranged within the duct. A deployable inlet scoop is mounted on the fuselage and is configured to be moveable between stowed and deployed positions. The stowed position blocks the opening into the duct and the deployed position exposes the opening and permits airflow through the duct. A method of providing electrical power includes identifying an electrical power demand condition, deploying an inlet scoop from an aircraft fuselage, and driving a ram air turbine with an airflow through the inlet scoop into the fuselage.

17 Claims, 2 Drawing Sheets

(56) References Cited

U.S. PATENT DOCUMENTS

| | | | |
|---|---|---|---|
| 5,697,394 A * | 12/1997 | Smith | B64D 33/02 137/15.1 |
| 5,718,371 A * | 2/1998 | Smith | B65D 25/525 222/528 |
| 6,056,237 A | 5/2000 | Woodland | |
| 6,127,758 A * | 10/2000 | Murry | B64D 41/007 244/53 R |
| 6,264,137 B1 * | 7/2001 | Sheoran | B64D 33/02 244/53 B |
| 6,270,309 B1 * | 8/2001 | Ghetzler | B64D 41/007 137/15.1 |
| 6,293,494 B1 | 9/2001 | Scherer et al. | |
| 6,349,899 B1 * | 2/2002 | Ralston | B64D 33/02 244/53 B |
| 6,584,764 B2 | 7/2003 | Baker | |
| 6,622,963 B1 * | 9/2003 | Ahrendt | B64D 29/08 244/53 B |
| 6,769,649 B2 | 8/2004 | Preston | |
| 6,840,479 B1 | 1/2005 | Przygoda et al. | |
| 7,469,545 B2 * | 12/2008 | Riley | B64D 41/00 244/53 B |
| 7,665,694 B2 * | 2/2010 | Hein | B64D 33/02 244/129.5 |
| 8,141,816 B2 * | 3/2012 | Robbins | B64D 33/02 244/129.4 |
| 8,245,976 B2 * | 8/2012 | Sakurai | B64C 21/02 244/129.5 |
| 8,678,310 B2 * | 3/2014 | Masoudipour | B64D 41/007 244/53 B |
| 8,882,028 B2 * | 11/2014 | Chase | F16D 31/02 244/53 B |
| 2003/0029162 A1 | 2/2003 | Baker | |
| 2010/0023169 A1 | 1/2010 | Delaloye | |
| 2010/0224158 A1 | 9/2010 | Oakes | |
| 2010/0307442 A1 * | 12/2010 | Bolender | B64D 15/16 123/184.56 |
| 2011/0067393 A1 | 3/2011 | Chase | |

\* cited by examiner

DEPLOYABLE INLET SCOOP FOR AN INBOARD RAM AIR TURBINE

BACKGROUND

This disclosure relates to a deployable inlet scoop for an inboard ram air turbine for an aircraft.

A ram air turbine (RAT) is commonly an aircraft power device, which extracts energy from the air stream surrounding an aircraft in order to provide emergency or auxiliary electrical and/or hydraulic power. A RAT is typically comprised of a turbine assembly, strut assembly, generator and/or hydraulic pump, and actuator. During operation, the turbine assembly, which is attached to the strut assembly, is deployed into the air stream by means of the actuator, typically by rotating the RAT from a stored position within the fuselage to a location exteriorly of the fuselage. Once deployed, the turbine is driven by the energy of the air stream surrounding the aircraft. The rotational motion of the turbine is then converted into electrical and/or hydraulic power.

Another form of RAT, dubbed "inboard" or "ducted," includes an enclosed turbine which is integral to a main aircraft fuselage or attached to the exterior of an aircraft via the use of a pod or similar device. Inboard RATs are driven by an axial-style, fixed pitch turbine which utilizes a shroud or ducting for channeling the input high velocity air. Inboard RATs can be used for both supplemental and emergency power generation applications.

SUMMARY

In one exemplary embodiment, an aircraft includes a fuselage that has an exterior contour with an opening and a duct that is arranged interiorly of the exterior contour and extends from the opening. A ram air turbine is arranged within the duct. A deployable inlet scoop is mounted on the fuselage and is configured to be moveable between stowed and deployed positions. The stowed position blocks the opening into the duct, and the deployed position exposes the opening and permits airflow through the duct.

In a further embodiment of any of the above, the inlet scoop includes a rigid door and a flexible member that is arranged on each of opposing lateral sides of the rigid door. The flexible member is connected to the fuselage.

In a further embodiment of any of the above, the flexible members are arranged in folds in the stowed position.

In a further embodiment of any of the above, each of the flexible members is wrapped about a roller which is configured to extend and retract the flexible member.

In a further embodiment of any of the above, the ram air turbine is fixed relative to the fuselage.

In a further embodiment of any of the above, the ram air turbine includes axial or mixed flow turbine blades that are configured to rotationally drive a generator.

In a further embodiment of any of the above, the fuselage includes an exit that is in communication with the duct opposite the inlet scoop and is provided in the exterior contour.

In a further embodiment of any of the above, an actuator is coupled to the inlet scoop and a controller is in communication with the actuator. The controller is configured to command the actuator to move the inlet scoop between the stowed and deployed positions.

In a further embodiment of any of the above, the aircraft includes at least one of a ram air turbine speed sensor and a ram air turbine voltage sensor. The controller is configured to regulate a position of the inlet scoop between the stowed and deployed positions to meter an amount of airflow through the duct in response to an output from at least one of the ram air turbine speed and voltage sensors.

In one exemplary embodiment, a ram air turbine system includes an inlet scoop configured to be moveable between stowed and deployed positions. A ram air turbine is in fluid communication with the inlet scoop. An actuator is connected to the inlet scoop and is configured to move the inlet scoop between stowed and deployed positions. A controller is in communication with the actuator and is configured to provide a command to the actuator to move the inlet scoop between the stowed and deployed positions.

In a further embodiment of any of the above, the inlet scoop includes a rigid door and a flexible member that is arranged on each of opposing lateral sides of the rigid door.

In a further embodiment of any of the above, the flexible members are arranged in folds in the stowed position.

In a further embodiment of any of the above, each of the flexible members are wrapped about a roller that is configured to extend and retract the flexible member.

In a further embodiment of any of the above, an actuator is coupled to the inlet scoop and a controller is in communication with the actuator. The controller is configured to command the actuator to move the inlet scoop between the stowed and deployed positions.

In a further embodiment of any of the above, ram air turbine system includes at least one of a ram air turbine speed sensor and a ram air turbine voltage sensor. The controller is configured to regulate a position of the inlet scoop between the stowed and deployed positions to meter an amount of airflow through the duct in response to an output from at least one of the ram air turbine speed and voltage sensors.

In one exemplary embodiment, a method of providing electrical power includes identifying an electrical power demand condition, deploying an inlet scoop from an aircraft fuselage, and driving a ram air turbine with an airflow through the inlet scoop into the fuselage.

In a further embodiment of any of the above, the method includes the step of regulating an opening size to selectively vary an airflow through the ram air turbine.

In a further embodiment of any of the above, the method includes the step of monitoring a generator output, and regulating the inlet scoop opening size based upon the output.

In a further embodiment of any of the above, the output includes one of a ram air turbine speed and a ram air turbine voltage.

In a further embodiment of any of the above, the deploying step includes extending a flexible member of an inlet scoop.

BRIEF DESCRIPTION OF THE DRAWINGS

The disclosure can be further understood by reference to the following detailed description when considered in connection with the accompanying drawings wherein.

DETAILED DESCRIPTION

Figure 1:
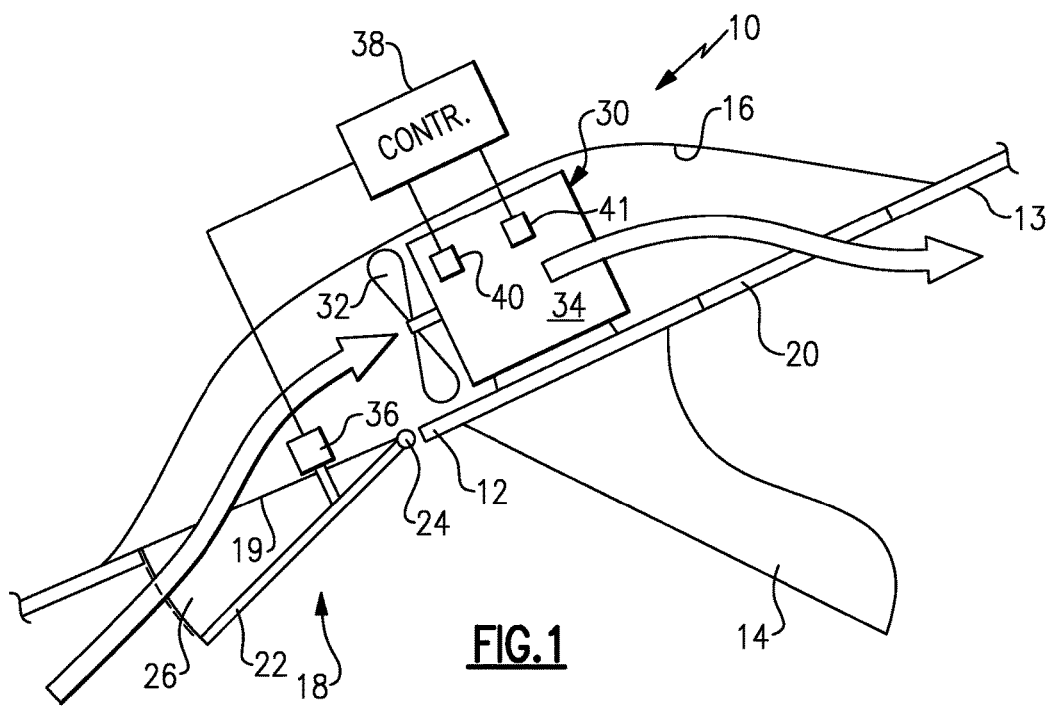
FIG. 1 is a schematic partial cross-sectional view of an aircraft fuselage in the area of an inboard ram air turbine.

An aircraft 10 is schematically illustrated in FIG. 1. The aircraft 10 includes a fuselage 12 with a wing 14, which is illustrated in a highly schematic fashion. A duct 16 is provided interiorly of an exterior contour 13 of the fuselage 12. The duct 16 may be positioned where desired on the aircraft 10. A ram air turbine (RAT) 30 is arranged within the duct 16.

An inlet scoop 18 is provided at a forward end of the duct 16, and an exit or outlet 20 is provided at a rearward end of the duct 16. The inlet scoop 18 is deployable between a stowed position shown in FIG. 2A, and a deployed position shown in FIGS. 1 and 2B.

Figure 2A:
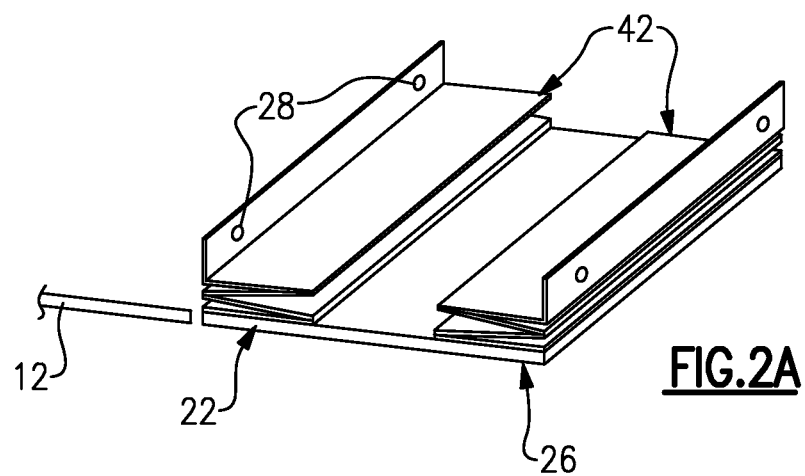
FIG. 2A is a perspective view of a deployable inlet scoop in a stowed position.
Figure 2B:
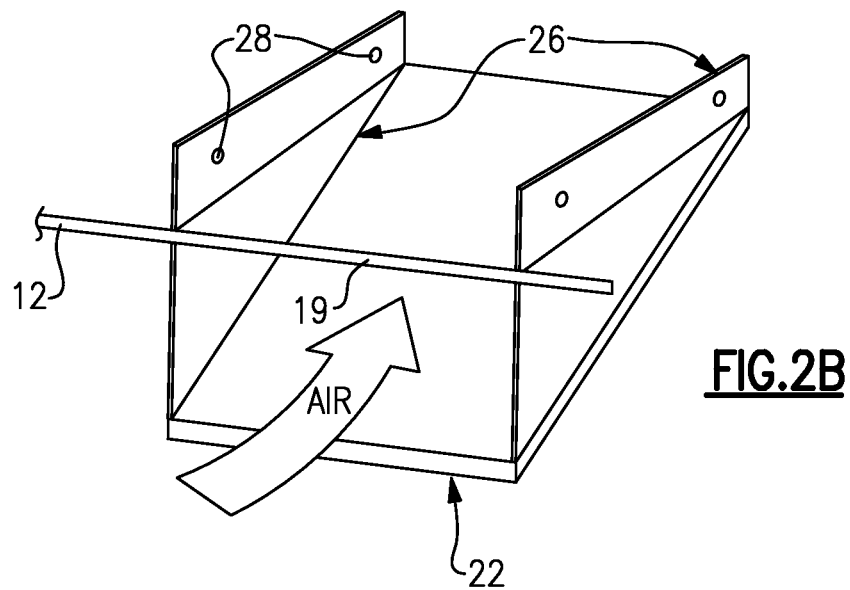
FIG. 2B is a perspective view of the deployable inlet scoop in a deployed position.

The inlet scoop 18 includes a door 22, which may be a rigid structure providing a portion of the exterior contour 13 when in the stowed position. The door 22 articulates about a pivot 24 between the stowed and deployed positions. Referring to FIGS. 2A and 2B, the inlet scoop 18 includes a flexible member 26 arranged on each of opposing lateral sides of the inlet scoop 18 to define an opening 19 in the exterior contour 13 when in the deployed position. The flexible members 26 may be woven fabric or non-woven material. The flexible members 26 may be constructed from a high tensile strength material, such as KEVLAR. The material has sufficient density to prevent airflow from passing through the material when the inlet scoop 18 is deployed. The flexible member 26 is secured to a support structure 28 provided by the fuselage 12. In the example shown in FIGS. 2A and 2B, the flexible members 26 include folds 42 that provide a bellows-type configuration.

The RAT 30 includes turbine blades 32 that rotationally drive a generator 34 in response to air flowing through the duct. An actuator 36 moves the inlet scoop 18 between the stowed and deployed positions. Typically, the inlet scoop 18 is deployed during an electrical power demand condition, such as situations in which emergency power is required.

A controller 38 is in communication with the actuator 36 and a speed sensor 40 and/or a voltage sensor 41, which are related to the generator output. The controller 38 is configured to command the actuator 36 to move the inlet scoop 18 between the stowed and deployed position. In one example, the controller 38 is configured to regulate the position of the inlet scoop 18, and associated opening size, between the stowed and deployed positions based upon the generator output to meter the amount of airflow through the duct to prevent, for example, overspeed or overvoltage conditions of the RAT 30. As the inlet scoop 18 is closed, the speed of the RAT 30 will decrease as the airflow through the duct 16 is reduced.

Figure 3:
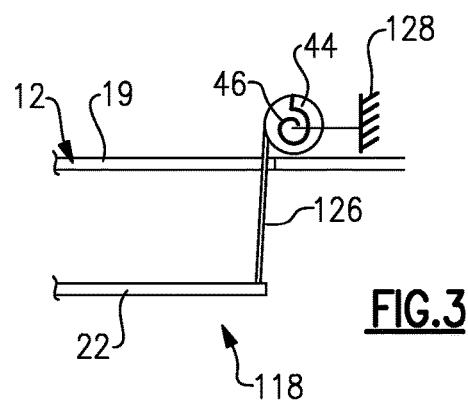
FIG. 3 is a partial cross-sectional view of another example inlet scoop in a deployed position.

FIG. 3 illustrates another example inlet scoop 118 selectively blocking the opening 19. A retractable flexible member 126 is arranged over a roller 44 that includes a spring 46 grounded to the support structure 128. The spring 46 maintains tension on the flexible member 126 during deployment and stowage of the inlet scoop 18.

Although an example embodiment has been disclosed, a worker of ordinary skill in this art would recognize that certain modifications would come within the scope of the claims. For that reason, the following claims should be studied to determine their true scope and content.

What is claimed is:

1. An aircraft comprising:
   a fuselage having an exterior contour with an opening and a duct arranged interiorly of the exterior contour and extending from the opening;
   a ram air turbine arranged within the duct;
   a deployable inlet scoop mounted on the fuselage and configured to be moveable between stowed and deployed positions, the stowed position blocking the opening into the duct, and the deployed position exposing the opening and permitting airflow through the duct;
   an actuator coupled to the inlet scoop; and
   a controller in communication with the actuator, the controller configured to command the actuator to move the inlet scoop between the stowed and deployed positions, the controller configured to regulate a position of the inlet scoop between the stowed and deployed positions and associated opening size to meter an amount of airflow through the duct in response to an output, at least one of a ram air turbine speed sensor and a ram air turbine voltage sensor providing the output, the controller configured to prevent at least one of an overspeed condition and an overvoltage condition of the ram air turbine with the inlet scoop, wherein the inlet scoop includes a rigid door and a flexible member arranged on each of opposing lateral sides of the rigid door, the flexible member connected to the fuselage.

2. The aircraft according to claim 1, wherein the flexible members are arranged in folds in the stowed position.

3. The aircraft according to claim 1, wherein each of the flexible members is wrapped about a roller, the roller is configured to extend and retract the flexible member.

4. The aircraft according to claim 1, wherein the ram air turbine is fixed relative to the fuselage.

5. The aircraft according to claim 4, wherein the ram air turbine includes axial or mixed flow turbine blades configured to rotationally drive a generator.

6. The aircraft according to claim 1, wherein the fuselage includes an exit in communication with the duct opposite the inlet scoop and provided in the exterior contour.

7. A ram air turbine system comprising:
   an inlet scoop configured to be moveable between stowed and deployed positions, wherein the inlet scoop includes a rigid door and a flexible member arranged on each of opposing lateral sides of the rigid door that together define an opening;
   a ram air turbine in fluid communication with the inlet scoop;
   an actuator connected to the inlet scoop and configured to move the inlet scoop between stowed and deployed positions; and
   a controller in communication with the actuator and configured to provide a command to the actuator to move the inlet scoop between the stowed and deployed positions, at least one of a ram air turbine speed sensor and a ram air turbine voltage sensor providing the output, the controller configured to regulate a position of the inlet scoop between the stowed and deployed positions to meter an amount of airflow through the duct in response to an output from at least one of the ram air turbine speed and voltage sensors, the controller configured to prevent at least one of an overspeed condition and an overvoltage condition of the ram air turbine with the inlet scoop, wherein the ram air turbine voltage sensor provides the output.

8. The ram air turbine system according to claim 7, wherein the flexible members are arranged in folds in the stowed position.

9. The ram air turbine system according to claim 7, wherein each of the flexible members is wrapped about a roller, the roller is configured to extend and retract the flexible member.

10. A method of providing electrical power comprising:
identifying an electrical power demand condition;
deploying an inlet scoop from an aircraft fuselage;
driving a ram air turbine with an airflow through the inlet scoop into the fuselage; and
regulating an opening size in between a fully deployed position and a fully closed position of the inlet scoop to selectively vary an airflow through the ram air turbine to prevent at least one of an overspeed condition and an overvoltage condition of the ram air turbine with the inlet scoop, wherein the regulating step is configured to prevent the overvoltage condition.

11. The method according to claim 10, comprising the step of monitoring a generator output, and regulating the inlet scoop opening size based upon the output.

12. The method according to claim 11, wherein the output includes one of a ram air turbine speed and a ram air turbine voltage.

13. The method according to claim 10, wherein the deploying step includes extending a flexible member of an inlet scoop.

14. The aircraft according to claim 1, wherein the ram air turbine voltage sensor provides the output.

15. The aircraft according to claim 1, wherein the controller is configured to prevent the overvoltage condition.

16. The ram air turbine system according to claim 7, wherein the controller is configured to prevent the overvoltage condition.

17. The method according to claim 12, wherein the ram air turbine voltage sensor provides the output.

* * * * *